(12) United States Patent
Huang

(10) Patent No.: US 8,933,976 B2
(45) Date of Patent: Jan. 13, 2015

(54) THREE-DIMENSIONAL DISPLAY PANEL AND DRIVING METHOD THEREOF

(75) Inventor: Yu-Sheng Huang, Kaohsiung City (TW)

(73) Assignee: Au Optronics Corporation, Hsinchu (TW)

( * ) Notice: Subject to any disclaimer, the term of this patent is extended or adjusted under 35 U.S.C. 154(b) by 225 days.

(21) Appl. No.: 13/353,271

(22) Filed: Jan. 18, 2012

(65) Prior Publication Data

US 2013/0113839 A1    May 9, 2013

(30) Foreign Application Priority Data

Nov. 9, 2011   (TW) .............................. 100140888 A

(51) Int. Cl.
| | |
|---|---|
| G09G 5/02 | (2006.01) |
| G09G 3/00 | (2006.01) |
| H04N 13/04 | (2006.01) |
| G09G 3/36 | (2006.01) |

(52) U.S. Cl.
CPC ........... *G09G 3/003* (2013.01); *H04N 13/0402* (2013.01); *H04N 13/0422* (2013.01); *H04N 13/0497* (2013.01); *H04N 13/0404* (2013.01); *H04N 13/0409* (2013.01); *H04N 13/0452* (2013.01); *G09G 3/3648* (2013.01); *G09G 2300/0426* (2013.01); *G09G 2300/0452* (2013.01)
USPC ....................................................... 345/695

(58) Field of Classification Search
CPC ...................................................... G09G 3/003
See application file for complete search history.

(56) References Cited

U.S. PATENT DOCUMENTS

| | | | |
|---|---|---|---|
| 4,812,017 A * | 3/1989 | Piper ............................. | 349/144 |
| 7,248,268 B2 | 7/2007 | Brown Elliott et al. | |
| 7,397,455 B2 | 7/2008 | Elliott et al. | |
| 7,492,379 B2 | 2/2009 | Credelle et al. | |
| 7,505,053 B2 | 3/2009 | Brown Elliott et al. | |
| 7,876,350 B2 | 1/2011 | Shin et al. | |
| 8,421,709 B2 | 4/2013 | Kang | |
| 2005/0001787 A1 | 1/2005 | Montgomery et al. | |

(Continued)

FOREIGN PATENT DOCUMENTS

| | | |
|---|---|---|
| CN | 101093630 | 12/2007 |
| TW | 201039616 | 11/2010 |

OTHER PUBLICATIONS

"Office Action of China Counterpart Application", issued on Aug. 21, 2013, p. 1-p. 6, in which the listed foreign reference was cited.

(Continued)

*Primary Examiner* — Quan-Zhen Wang
*Assistant Examiner* — Chad Dicke
(74) *Attorney, Agent, or Firm* — Jianq Chyun IP Office

(57) ABSTRACT

A three-dimensional (3D) display panel has a plurality of rows and a plurality of columns, and each of the rows has at least one sub-row. The 3D display panel includes at least one first group and at least one second group arranged on the first row. The first group and the second group respectively have a first color region, a second color region and a third color region. The first color region and the second color region of the first group as well as the third color region and the first color region of the second group are arranged on one sub-row, while the third color region of the first group and the second color region of the second group are arranged on another sub-row.

1 Claim, 7 Drawing Sheets

(56) References Cited

U.S. PATENT DOCUMENTS

| | | |
|---|---|---|
| 2007/0109468 A1* | 5/2007 | Oku .............................. 349/110 |
| 2007/0291054 A1 | 12/2007 | Shin et al. |
| 2009/0322215 A1* | 12/2009 | Sung et al. ................... 313/504 |
| 2010/0265230 A1 | 10/2010 | Kang |
| 2011/0043715 A1 | 2/2011 | Ohyama et al. |
| 2011/0080473 A1* | 4/2011 | Lee ................................ 348/51 |

OTHER PUBLICATIONS

"Office Action of Taiwan Counterpart Application", issued on Jan. 29, 2014, p. 1-p. 8, in which TW201039616 was cited.

* cited by examiner

THREE-DIMENSIONAL DISPLAY PANEL AND DRIVING METHOD THEREOF

CROSS-REFERENCE TO RELATED APPLICATION

This application claims the priority benefit of Taiwan application serial no. 100140888, filed on Nov. 9, 2011. The entirety of the above-mentioned patent application is hereby incorporated by reference herein and made a part of this specification.

BACKGROUND OF THE DISCLOSURE

1. Field of the Disclosure

The invention relates to a three-dimensional (3D) display panel and a driving method thereof.

2. Description of Related Art

At present, three-dimensional display technologies can be roughly categorized into auto-stereoscopic technologies that allow a viewer to directly watch images with naked eyes and stereoscopic technologies that require the viewer to wear specially designed glasses. According to the operational principle of an auto-stereoscopic display device, a fixed barrier is utilized to control images received by left and right eyes of the viewer. On account of visual characteristics of human eyes, when images with the same content but different parallax are respectively captured by the viewer's left and right eyes, the images that seem to be superposed may be perceived as a stereoscopic image. In general, cylindrical lenses are required to be configured on the display panel of the auto-stereoscopic display device, such that the right-eye and left-eye images displayed on the display panel can be respectively sent to the right and left eyes of the viewer.

To prevent the light corresponding to a left-eye signal from entering the right eye or prevent the light corresponding to a right-eye signal from entering the left eye, whether a light shielding region for blocking the entry of said light occupies a sufficient area in the auto-stereoscopic display should be taken into consideration, and thereby the crosstalk issue at a vertical viewing angle can be resolved to a better extent.

SUMMARY OF THE DISCLOSURE

In one aspect, a 3D display panel has a plurality of rows and a plurality of columns is provided, and each of the rows has at least one sub-row. The 3D display panel includes at least one first group and at least one second group arranged on the first row. The first group and the second group respectively have a first color region, a second color region, and a third color region. The first color region and the second color region of the first group as well as the third color region and the first color region of the second group are arranged on one sub-row, while the third color region of the first group and the second color region of the second group are arranged on another sub-row.

In another aspect, a driving method of a 3D display panel includes providing the aforesaid 3D display panel. The 3D display panel further includes at least one third group arranged on the first row together with the at least one first group and the at least one second group. The third group has a first color region, a second color region, and a third color region. The second color region and the third color region of the third group, the first color region and the second color region of the first group, and the third color region and the first color region of the second group are arranged on one sub-row, while the first color region of the third group, the third color region of the first group, and the second color region of the second group are arranged on another sub-row. The 3D display panel further includes at least one fourth group, at least one fifth group, and at least one sixth group arranged on a second row of the row. The fourth group, the fifth group, and the sixth group respectively have a first color region, a second color region, and a third color region. The arrangement of the first color regions, the second color regions, and the third color regions of the different groups on the second row is the same as the arrangement of the first color regions, the second color regions, and the third color regions of the different groups on the first row. When a stereoscopic image is to be displayed, the third color region of the first group, the second color region of the second group, and the first color region of the third group are turned off, so as to form a first shielding region, and the third color region of the fourth group, the second color region of the fifth group, and the first color region of the sixth group are turned off, so as to form a second shielding region. Here, the first color region and the second color region of the first group and the third color region of the second group together form a first 3D display pixel unit. The first color region of the second group and the second color region and the third color region of the third group together form a second 3D display pixel unit. The first color region and the second color region of the fourth group and the third color region of the fifth group together form a third 3D display pixel unit. The first color region of the fifth group and the second color region and the third color region of the sixth group together form a fourth 3D display pixel unit. The first shielding region and the second shielding region are not adjacent to each other.

In still another aspect, a driving method of a 3D display panel includes providing the aforesaid 3D display panel. The 3D display panel further includes at least one third group arranged on the first row together with the at least one first group and the at least one second group. The third group has a first color region, a second color region, and a third color region. The second color region and the third color region of the third group, the first color region and the second color region of the first group, and the third color region and the first color region of the second group are arranged on one sub-row, while the first color region of the third group, the third color region of the first group, and the second color region of the second group are arranged on another sub-row. The 3D display panel further includes at least one fourth group, at least one fifth group, and at least one sixth group arranged on a second row of the row. The fourth group, the fifth group, and the sixth group respectively have a first color region, a second color region, and a third color region. The arrangement of the first color regions, the second color regions, and the third color regions of the different groups on the second row is mirror symmetrical to the arrangement of the first color regions, the second color regions, and the third color regions of the different groups on the first row. When a stereoscopic image is to be displayed, the third color region of the first group, the second color region of the second group, and the first color region of the third group are turned off, so as to form a first shielding region, and the third color region of the fourth group, the second color region of the fifth group, and the first color region of the sixth group are turned off, so as to form a second shielding region. Here, the first color region and the second color region of the first group and the third color region of the second group together form a first 3D display pixel unit. The first color region of the second group and the second color region and the third color region of the third group together form a second 3D display pixel unit. The first color region and the second color region of the fourth group and the third color region of the fifth group together form a third 3D display pixel unit. The first color region of the fifth group and the second color region and the third color region of the sixth group together form a fourth 3D display pixel unit. The first shielding region and the second shielding region are adjacent to each other.

In still another aspect, a 3D display panel having a plurality of sub-columns and a plurality of sub-rows is provided. The 3D display panel has at least one first region and at least one second region on a first sub-row of the sub-rows, and the first region and the second region respectively have two different colors. The 3D display panel further has at least one third region on a second sub-row of the sub-rows, and the third region has at least one color. The colors of the first region are different from the color of the third region corresponding to the first region, and the colors of the second region are different from the color of the third region corresponding to the second region.

In still another aspect, a 3D display panel has a plurality of rows and a plurality of columns is provided, and each of the rows has at least one sub-row. The 3D display panel includes at least one first group and at least one second group. The first group and the second group respectively have a first color region, a second color region, and a third color region. The first color region and the second color region of the first group are arranged on a first sub-row of the sub-rows, the third color region of the first group and the third color region of the second group are arranged on a second sub-row of the sub-rows, and the first color region and the second color region of the second group are arranged on a third sub-row of the sub-rows. The first color region, the second color region, and the third color region of the first group together form a first substantially L-shaped region, and the first color region, the second color region, and the third color region of the second group together form a second substantially L-shaped region.

In still another aspect, a driving method of a 3D display panel includes providing the aforesaid 3D display panel. The 3D display panel further includes at least one third group and at least one fourth group. The third group and the fourth group respectively have a first color region, a second color region, and a third color region. The first color region and the third color region of the third group are arranged on the first sub-row, the second color region of the third group and the second color region of the fourth group are arranged on the second sub-row, and the first color region and the third color region of the fourth group are arranged on the third sub-row. The 3D display panel further includes at least one fifth group and at least one sixth group. The fifth group and the sixth group respectively have a first color region, a second color region, and a third color region. The second color region and the third color region of the fifth group are arranged on the first sub-row, the first color region of the fifth group and the first color region of the sixth group are arranged on the second sub-row, and the second color region and the third color region of the sixth group are arranged on the third sub-row. When a stereoscopic image is to be displayed, the third color region of the first group, the third color region of the second group, the second color region of the third group, the second color region of the fourth group, the first color region of the fifth group, and the first color region of the sixth group are turned off, so as to form a shielding region. Here, the first color region and the second color region of the first group and the third color region of the third group together form a first 3D display pixel unit. The first color region of the third group and the second color region and the third color region of the fifth group together form a second 3D display pixel unit. The first color region and the second color region of the second group and the third color region of the fourth group together form a third 3D display pixel unit. The first color region of the fourth group and the second color region and the third color region of the sixth group together form a fourth 3D display pixel unit.

Based on the above, each color region in the display panel is arranged in a special manner according to the embodiments of the invention. Thereby, when displaying a stereoscopic image, the display can have a sufficient shielding region to reduce the crosstalk at the vertical viewing angle. In addition, even though the display is in a 3D display mode, the image resolution of the display can consistently reach an acceptable level of performance.

In order to make the aforementioned and other features and advantages of the invention more comprehensible, embodiments accompanying figures are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the invention.

DESCRIPTION OF EMBODIMENTS

Reference will now be made in detail embodiments of the invention examples of which are illustrated in the accompanying drawings.

First Embodiment

Figure 1:
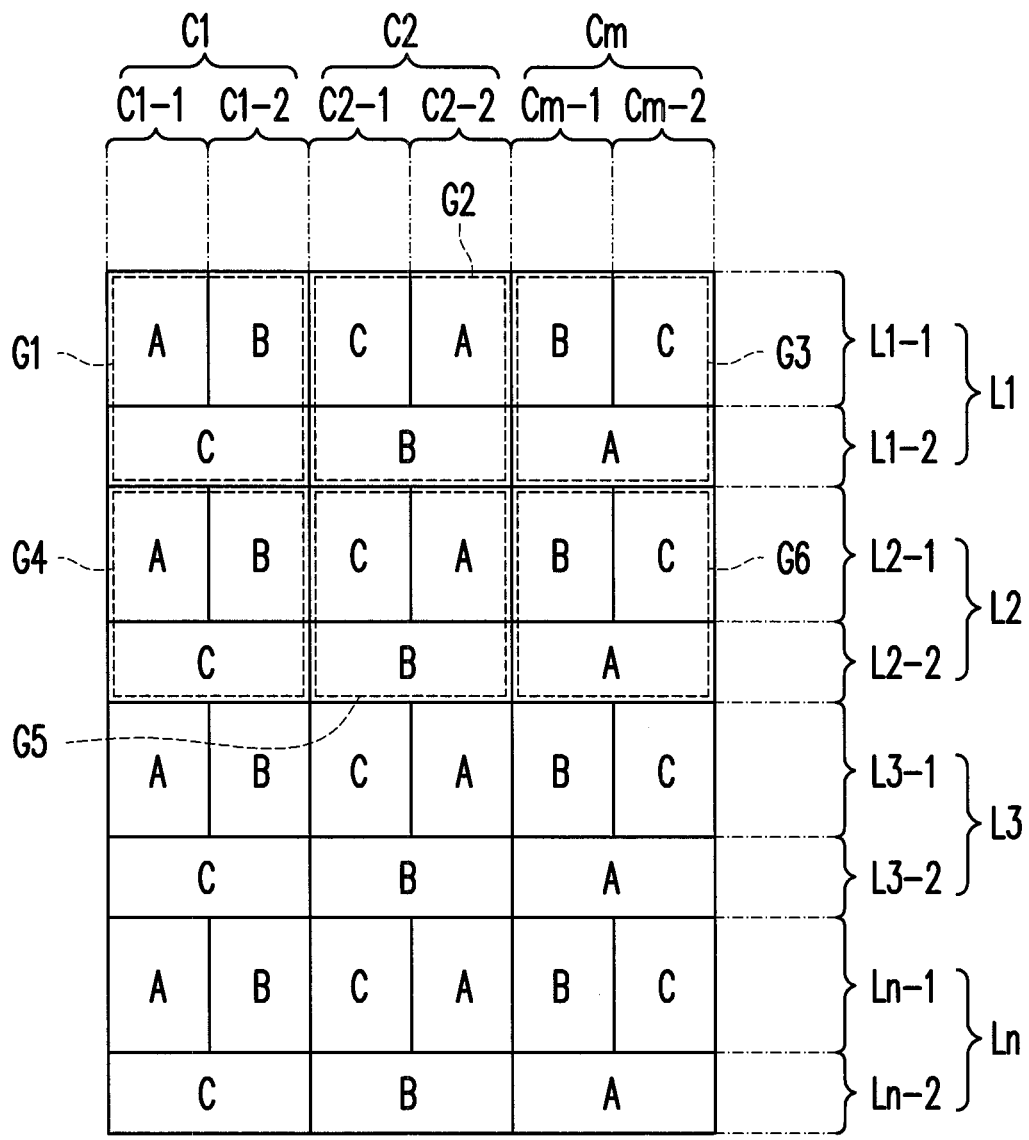
FIG. 1 is a schematic view illustrating a 3D display according to an exemplary embodiment.

FIG. 1 is a schematic view illustrating a 3D display according to an exemplary embodiment. With reference to FIG. 1, the 3D display panel of this embodiment includes a plurality of columns C1~Cm (also referred to as vertical columns) and a plurality of rows L1~Ln (also referred to as horizontal rows). Each of the columns C1~Cm has at least one sub-column, and each of the rows L1~Ln has at least one sub-row. For instance, the first column C1 has sub-columns C1-1 and C1-2, and the $m^{th}$ column has sub-columns Cm-1 and Cm-2. The first row L1 has sub-rows L1-1 and L1-2, and the $n^{th}$ row has sub-rows Ln-1 and Ln-2.

The 3D display panel includes at least one first group G1 and at least one second group G2 arranged on the first row L1, and the first group G1 and the second group G2 respectively have a first color region A, a second color region B, and a third color region C. According to this embodiment, each of the first color region A, the second color region B, and the third color region C is a sub-pixel region. Each sub-pixel region includes a sub-pixel structure located on a substrate, a color filter unit corresponding to the sub-pixel structure, and a display medium located between the substrate and an opposite substrate.

Figure 7:
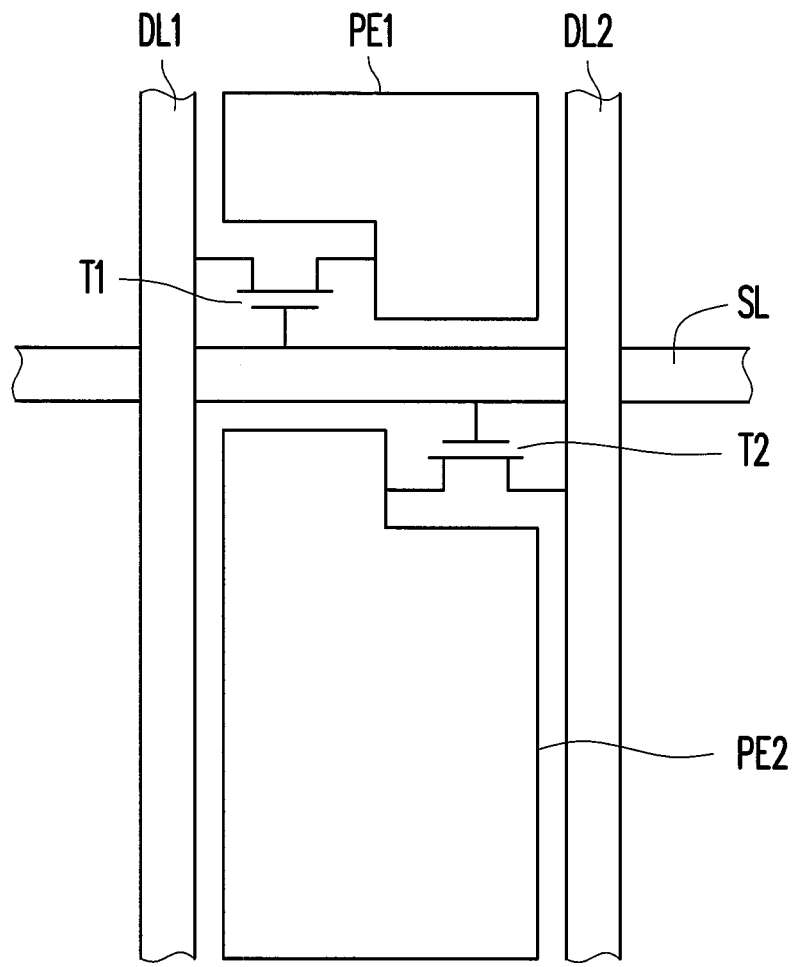
FIG. 7 is a schematic view illustrating a sub-pixel structure in a 3D display according to an exemplary embodiment.

Here, the sub-pixel structure is exemplarily shown in FIG. 7 and includes a scan line SL, data lines DL1 and DL2, an active device T1 electrically connected to the scan line SL and the data line DL1, an active device T2 electrically connected to the scan line SL and the data line DL2, a pixel electrode PE1 electrically connected to the active device T1, and a pixel electrode PE2 electrically connected to the active device T2. In this embodiment, the pixel electrode PE1 electrically connected to the active device T1 can be referred to as a main-pixel electrode, and the pixel electrode PE2 electrically connected to the active device T2 can be referred to as a sub-pixel electrode. Besides, the pixel electrode PE1 and the pixel electrode PE2 further include slit patterns (not shown). In each of the sub-pixel structures, the design of the main-pixel electrode and the sub-pixel electrode may resolve the color shift issue of the display. However, in the invention, the sub-pixel structure is not limited to be equipped with the structure of the main-pixel electrode PE1 and the sub-pixel electrode PE2 shown in FIG. 7. Moreover, on the premise that each sub-pixel structure is designed to have the main-pixel electrode and the sub-pixel electrode for resolving the color shift issue of the display, the pattern design of the main-pixel electrode PE1 and the sub-pixel electrode PE2 in the sub-pixel structure is not limited in the invention. In addition, the active devices T1 and T2 are exemplarily connected to the same scan line SL according to this embodiment, which should however not be construed as a limitation to the invention. According to another embodiment, the active devices T1 and T2 may be connected to the different scan lines SL. In addition, the active devices T1 and T2 are respectively connected to different data lines DL1 and DL2 according to this embodiment, which should however not be construed as a limitation to the invention. According to another embodiment, the active devices T1 and T2 may be connected to the same data line, e.g., the data line DL1 or the data line DL2. The above design can be modified to form other pixel structures, and there may be more than two active devices if deemed necessary. The active devices T1 and T2 include top-gate or bottom-gate structures, and the semiconductor material constituting the active devices T1 and T2 may have a single-layer structure or a multi-layer structure. Specifically, the semiconductor material includes an oxide semiconductor material, a mono-silicon material, a polysilicon material, a micro-silicon material, an amorphous silicon material, an organic semiconductor material, an organic material containing said components, any other appropriate semiconductor material, or a combination of at least two of the above-mentioned materials.

The color filter unit corresponding to each sub-pixel structure may be a red color filter unit, a green color filter unit, or a blue color filter unit. To be more specific, the sub-pixel region corresponding to the red color filter unit is the red sub-pixel region, the sub-pixel region corresponding to the green color filter unit is the green sub-pixel region, and the sub-pixel region corresponding to the blue color filter unit is the blue sub-pixel region. According to this embodiment, the first color region A, the second color region B, and the third color region C are the red color region, the green color region, and the blue color region, respectively, which should however not be construed as a limitation to the invention. In another embodiment, white light can be generated by mixing colors from at least three color regions, and the colors can be selected from the chromaticity diagram. Note that the number of regions with different colors may be limited to three, and four, five, six, or more regions with different colors may also be added; the colors of the fourth, fifth, sixth, and so on regions can be determined by selecting a less saturated color from the three colors, a complementary color, or a color mixed by at least two other colors.

As to the display medium located between the substrate and the opposite substrate, it includes a non-self-luminescent medium (e.g., a liquid crystal display medium, an electrophoretic medium, an electrowetting medium, or any other appropriate medium), a self-luminescent medium (e.g., a polymer organic light emitting medium, a small-molecule organic light emitting medium, an inorganic light emitting medium, or any other appropriate medium), any other appropriate display medium, or a combination thereof.

As shown in FIG. 1, in this embodiment, the first color region A and the second color region B of the first group G1 as well as the third color region C and the first color region A of the second group G2 are arranged on one sub-row L1-1, while the third color region C of the first group G1 and the second color region B of the second group G2 are arranged on another sub-row L1-2. The length of the long side of the third color region C of the first group G1 is substantially equal to the total length of the short side of the first color region A and the short side of the second color region B of the first group G1. The length of the long side of the second color region B of the second group G2 is substantially equal to the total length of the short side of the third color region C and the short side of the first color region A of the second group G2. Therefore, the first color region A, the second color region B, and the third color region C of the first group G1 may together form one substantially rectangular region, while the first color region A, the second color region B, and the third color region C of the second group G2 may together form another substantially rectangular region.

In view of the above, the 3D display shown in FIG. 1 further includes a third group G3 arranged on the first row L1 (i.e., on the same row) together with the first group G1 and the second group G2, and the third group G3 has a first color region A, a second color region B, and a third color region C. The second color region B and the third color region C of the third group G3, the first color region A and the second color region B of the first group G1, and the third color region C and the first color region A of the second group G2 are arranged on one sub-row L1-1, while the first color region A of the third group G3, the third color region C of the first group G1, and the second color region B of the second group G2 are arranged on another sub-row L1-2.

The 3D display further includes at least one fourth group G4, at least one fifth group G5, and at least one sixth group G6 arranged on the second row L2. The fourth group G4, the fifth group G5, and the sixth group G6 respectively have a first color region A, a second color region B, and a third color region C. The arrangement of the first color regions A, the second color regions B, and the third color regions C of the groups G4~G6 on the second row L2 is the same as the arrangement of the first color regions A, the second color regions B, and the third color regions C of the groups G1~G3 on the first row L1. In other words, the first color region A and the second color region B of the fourth group G4, the third color region C and the first color region A of the fifth group G5, and the second color region B and the third color region C of the sixth group G6 are arranged on one sub-row L2-1, while the third color region C of the fourth group G4, the second color region B of the fifth group G5, and the first color region A of the sixth group G6 are arranged on another sub-row L2-2.

Namely, in the embodiment shown in FIG. 1, at least one first region (including the color regions A and B) and at least one second region (including the color regions C and A) are arranged on the first sub-row L1-1, and each of the first and second regions respectively has two different colors; at least one third region (including the color region C or B) is arranged on the second sub-row L1-2, and the third region has at least one color. The colors (e.g., red and green) of the first region (including the color regions A and B) are substantially different from the color (e.g., blue) of the third region (including the color region C) corresponding to the first region, and the colors (e.g., blue and red) of the second region (including the color regions C and A) are substantially different from the color (e.g., green) of the third region (including the color region B) corresponding to the second region.

Besides, at least one fourth region (including the color regions B and C) is further arranged on the first sub-row L1-1, and the fourth region has two different colors (e.g., green and blue). At least one fifth region (including the color region A) is arranged on the second sub-row L1-2, and the fifth region has at least one color (e.g., red) and corresponds to the fourth region (including the color regions B and C), wherein the fifth region has the color (e.g., red) of the color region A which is substantially different from the color (e.g., blue or green) of the third region (including the color region C or B) corresponding to the first region and the second region.

According to the embodiment shown in FIG. 1, at least one sixth region (including the color regions A and B), at least one seventh region (including the color regions C and A), and at least one eighth region (including the color regions B and C) are arranged on the third sub-row (i.e., the first sub-row L2-1 of the second row L2), and each of the sixth, seventh, and eighth regions respectively has two substantially different colors. The colors (e.g., red and green) of the sixth region (including the color regions A and B) are substantially the same as the colors (e.g., red and green) of the first region (including the color regions A and B); the colors (e.g., blue and red) of the seventh region (including the color regions C and A) are substantially the same as the colors (e.g., blue and red) of the second region (including the color regions C and A); the colors (e.g., green and blue) of the eighth region (including the color regions B and C) are substantially the same as the colors (e.g., green and blue) of the fourth region (including the color regions B and C).

A ninth region (including the color region C, B, or A) is arranged on the fourth sub-row (i.e., the second sub-row L2-2 of the second row L2), and the ninth region has at least one color (e.g., blue, green, or red). The color (e.g., blue or green) of the ninth region (including the color region C or B) corresponding to the sixth region (including the color regions A and B) and the seventh region (including the color regions C and A) is substantially the same as the color (e.g., blue or green) of the third region (including the color region C or B) corresponding to the first region (including the color regions A and B) and the second region (including the color regions C and A). The color (e.g., red) of the ninth region (including the color region A) corresponding to the eighth region (including the color regions B and C) is substantially the same as the color (e.g., red) of the fifth region (including the color region A) corresponding to the fourth region (including the color regions B and C).

In the aforesaid display, when images are displayed in a two-dimensional (2D) display mode, the arrangement of the sub-pixel regions is shown in FIG. 1, and each of the groups (G1~G6) is equal to one pixel unit containing at least three sub-pixel regions with different colors (i.e., red, green, and blue sub-pixel regions).

Figure 2:
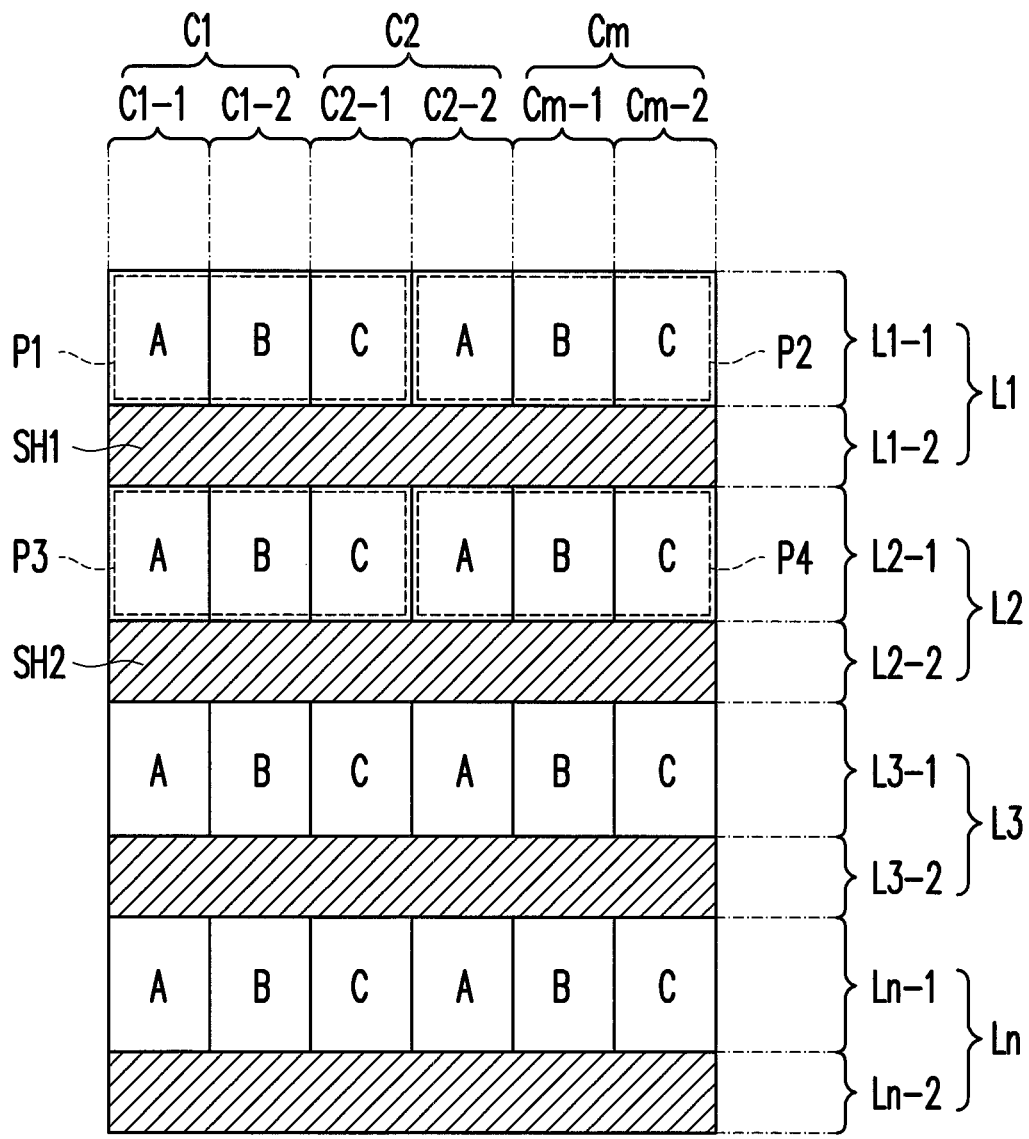
FIG. 2 is a schematic view illustrating the 3D display depicted in FIG. 1 in a 3D display mode.

By contrast, when the images are displayed in a 3D display mode, the driving method of the display is described below. With reference to FIG. 1 and FIG. 2, the driving method includes turning off the third color region C of the first group G1, the second color region B of the second group G2, and the first color region A of the third group G3, so as to form a first shielding region SH1 (shown in FIG. 2); turning off the third color region C of the fourth group G4, the second color region B of the fifth group G5, and the first color region A of the sixth group G6, so as to form a second shielding region SH2 (shown in FIG. 2). Here, the first and second shielding regions SH1 and SH2 can block both the light corresponding to the right-eye signal from entering the left eye and block the light corresponding to the left-eye signal from entering the right eye, and thereby the crosstalk issue at a vertical viewing angle can be resolved to a better extent.

After the first and second shielding regions SH1 and SH2 are formed, the first color region A and the second color region B of the first group G1 and the third color region C of the second group G2 together form a first 3D display pixel unit P1 (shown in FIG. 2); the first color region A of the second group G2 and the second color region B and the third color region C of the third group G3 together form a second 3D display pixel unit P2 (shown in FIG. 2); the first color region A and the second color region B of the fourth group G4 and the third color region C of the fifth group G5 together form a third 3D display pixel unit P3 (shown in FIG. 2); the first color region A of the fifth group G5 and the second color region B and the third color region C of the at least sixth group G6 together form a fourth 3D display pixel unit P4 (shown in FIG. 2). That is to say, in the 3D display mode, each of the 3D display pixel units P1~P4 is one pixel unit containing at least three sub-pixel regions with different colors (i.e., red, green, and blue sub-pixel regions). Specifically, the first 3D display pixel unit P1 and the second 3D display pixel unit P2 arranged on the first sub-row L1-1 of the first row L1 provide image information to the left eye of a viewer, and the third 3D display pixel unit P3 and the fourth 3D display pixel unit P4 arranged on the first sub-row L2-1 of the second row L2 provide image information to the right eye of the viewer. Note that the image information can also be provided to the left eye of the viewer by the pixel unit respectively on the first sub-row L3-1 of the third row L3 and to the right eye of the viewer by the first sub-row L4-1 of the fourth row L4 when the stereoscopic image is displayed. Hence, in order to display the stereoscopic image, the image information provided to the left eye (Le) and the right eye (Re) of the viewer substantially includes Le1-Re1-Le2-Re2 arranged sequentially from top to bottom in front view of the FIG. 2. Here, the information provided to the left eye is Le1, Le2, and the information provided to the right eye is Re1, Re2. According to another embodiment, a optical shutter may be alternatively disposed between the viewer and the 3D display panel, so as to ensure the transmission of left-eye and right-eye information to the left eye and the right eye of the viewer and prevent the crosstalk of the left-eye and right-eye information.

The first shielding region SH1 and the second shielding region SH2 are not adjacent to each other in this embodiment. Hence, each shielding region is formed on the second sub-row of each row.

As described in the previous embodiment, if the image resolution is 3840*2160 in the 2D display mode, the image resolution may still reach 2560*1080 in the 3D display mode, and the resolution (2560*1080) in the 3D display mode is still greater than the resolution of a Full-HD display panel. Besides, the color regions (i.e., the sub-pixel regions) on certain sub-rows are turned off in the 3D display mode according to this embodiment; namely, the main-pixel electrodes and the sub-pixel electrodes in the color regions (i.e., the sub-pixel regions) that are not turned off may still be applied to drive the display medium, so as to reduce color shift. Hence, by applying the driving method described in this embodiment, the color performance in the 3D display mode and in the 2D display mode can be at similar levels.

Second Embodiment

Figure 3:
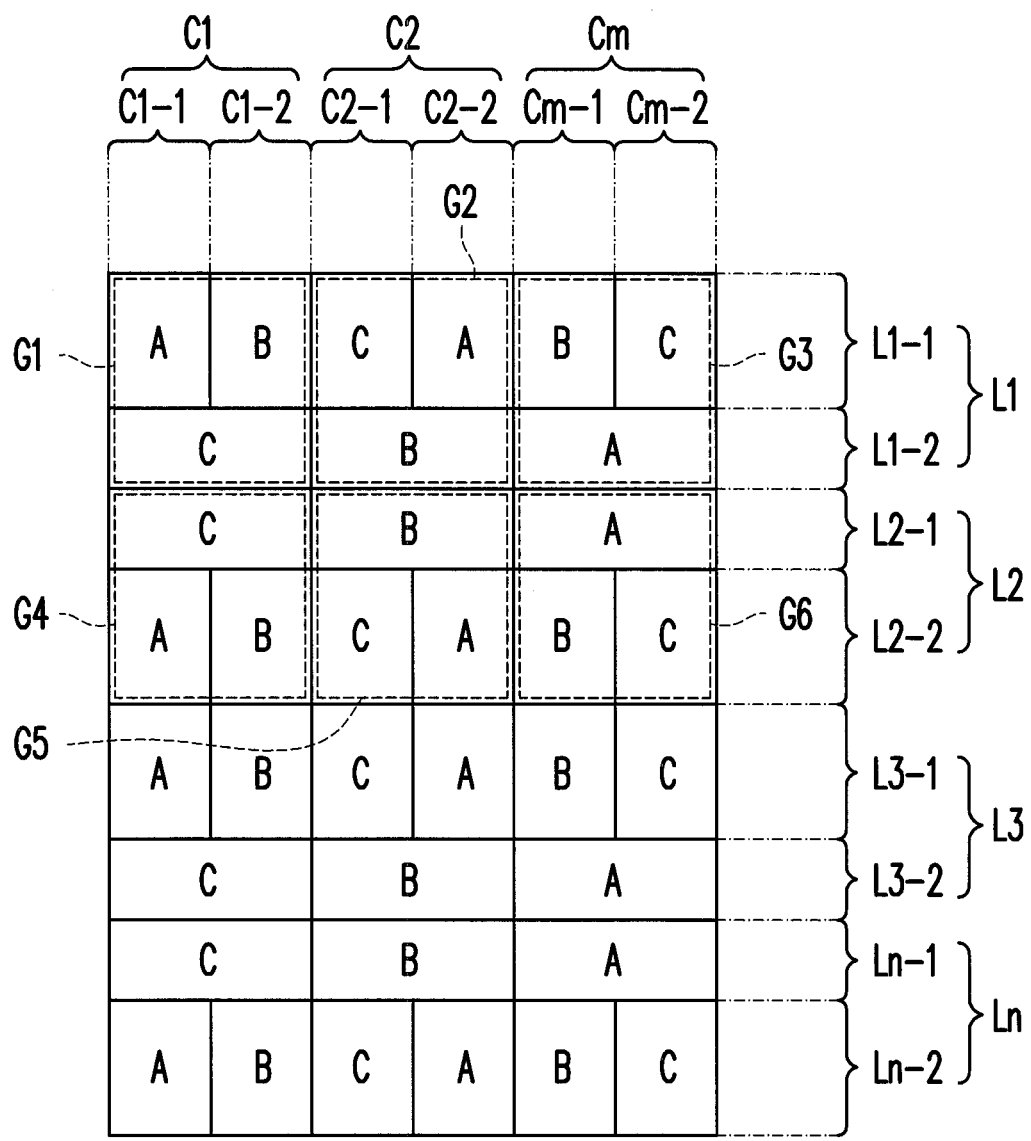
FIG. 3 is a schematic view illustrating a 3D display according to an exemplary embodiment.

FIG. 3 is a schematic view illustrating a 3D display according to an exemplary embodiment. The embodiment shown in FIG. 3 is similar to the embodiment shown in FIG. 1, and thus identical components in FIG. 3 and FIG. 1 will be denoted with the same numerals and will not be repeated herein. According to the embodiment shown in FIG. 3, the arrangement of the first color regions A, the second color regions B, and the third color regions C of the groups G4~G6 on the second row L2 is mirror symmetrical to the arrangement of the first color regions A, the second color regions B, and the third color regions C of the groups G1~G3 on the first row L1. Particularly, the arrangement of the first color region A, the second color region B, and the third color region C of the first group G1 is mirror symmetrical to the arrangement to the arrangement of the first color region A, the second color region B, and the third color region C of the fourth group G4, and therefore the third color region C of the first group G1 and the third color region C of the fourth group G4 are adjacent to each other; preferably, the third color regions C of the first and fourth groups G1 and G4 are directly adjoined (or namely directly contacted). The arrangement of the first color region A, the second color region B, and the third color region C of the second group G2 is mirror symmetrical to the arrangement to the arrangement of the first color region A, the second color region B, and the third color region C of the fifth group G5, and therefore the second color region B of the second group G2 and the second color region B of the fifth group G5 are adjacent to each other; preferably, the second color regions B of the second and fifth groups G2 and G5 are directly adjoined (or namely directly contacted). The arrangement of the first color region A, the second color region B, and the third color region C of the third group G3 is mirror symmetrical to the arrangement to the arrangement of the first color region A, the second color region B, and the third color region C of the sixth group G6, and therefore the first color region A of the third group G3 and the first color region A of the sixth group G6 are adjacent to each other; preferably, the first color regions A of the third and sixth groups G3 and G6 are directly adjoined (or namely directly contacted).

In other words, according to the present embodiment, at least one sixth region (including the color region C), at least one seventh region (including the color region B), and at least one eighth region (including the color region A) are arranged on the third sub-row (i.e., the first sub-row L2-1 of the second row L2), and each of the sixth, seventh, and eighth regions respectively has at least one color. The color of the sixth region (including the color region C) is substantially the same as the color of the third region (including the color region C) corresponding to the first region (including the color regions A and B); the color of the seventh region (including the color region B) is substantially the same as the color of the third region (including the color region B) corresponding to the second region (including the color regions C and A); the color of the eighth region (including the color region A) is substantially the same as the color of the fifth region (including the color region A) corresponding to the fourth region (including the color regions B and C). A ninth region arranged on the fourth sub-row (i.e., the second sub-row L2-2 of the second row L2) has at least two colors, the colors of the ninth region corresponding to the sixth region and the seventh region are substantially the same as the colors of the first region and the second region, and the colors of the ninth region corresponding to the eighth region are substantially the same as the colors of the fourth region.

In the aforesaid display, when images are displayed in a 2D mode, the arrangement of the sub-pixel regions is shown in FIG. 3, and each of the groups (G1~G6) is equal to one pixel unit containing at least three sub-pixel regions with different colors (i.e., red, green, and blue sub-pixel regions).

Figure 4:
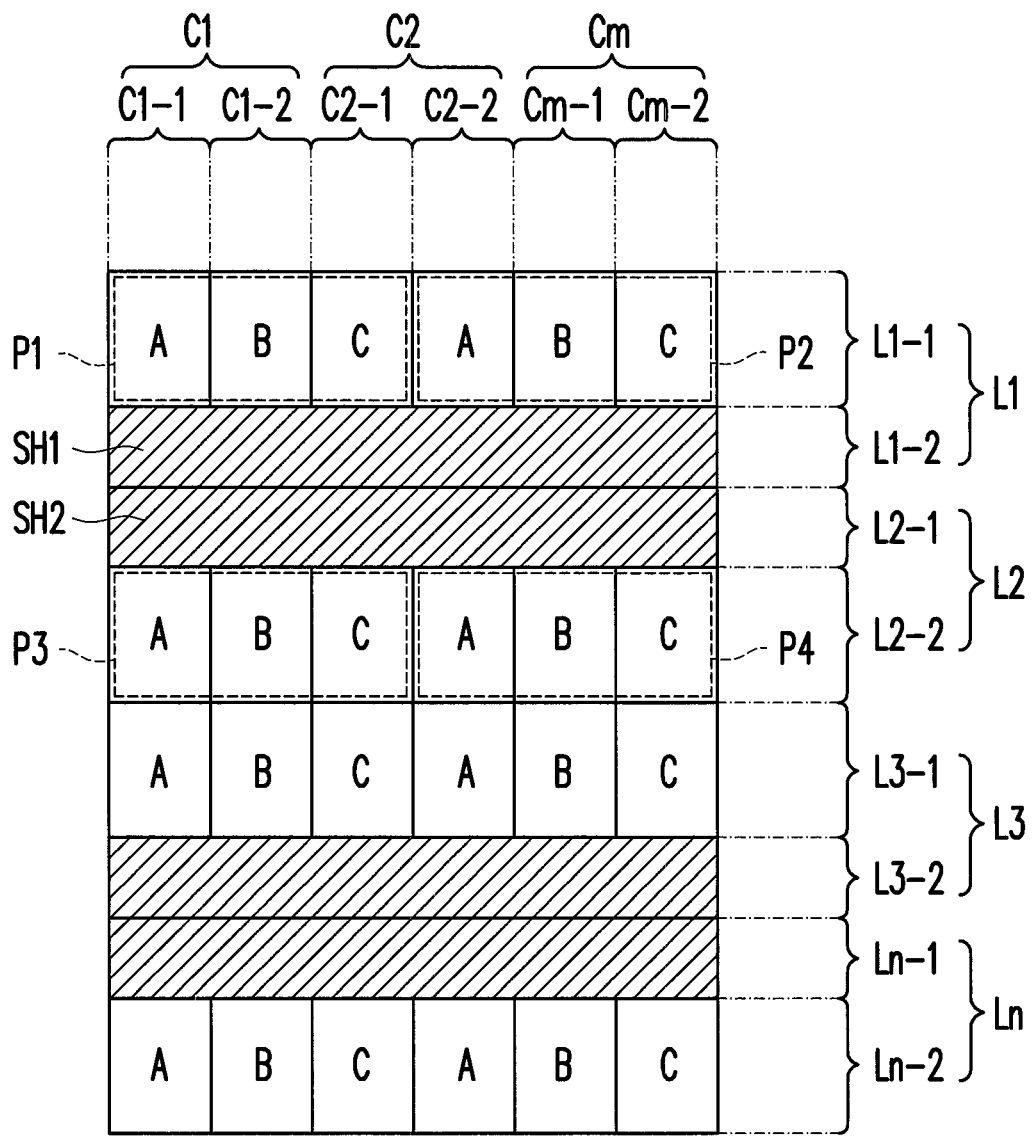
FIG. 4 is a schematic view illustrating the 3D display depicted in FIG. 3 in a 3D display mode.

By contrast, when the images are displayed in a 3D display mode, the driving method of the display is described below. With reference to FIG. 3 and FIG. 4, the driving method includes turning off the third color region C of the first group G1, the second color region B of the second group G2, and the first color region A of the third group G3, so as to form a first shielding region SH1 (shown in FIG. 4); turning off the third color region C of the fourth group G4, the second color region B of the fifth group G5, and the first color region A of the sixth group G6, so as to form a second shielding region SH2 (shown in FIG. 4). Here, the first and second shielding regions SH1 and SH2 can block both the light corresponding to the right-eye signal from entering the left eye and block the light corresponding to the left-eye signal from entering the right eye, and thereby the crosstalk issue at a vertical viewing angle can be resolved to a better extent.

After the first and second shielding regions SH1 and SH2 are formed, the first color region A and the second color region B of the first group G1 and the third color region C of the second group G2 together form a first 3D display pixel unit P1 (shown in FIG. 4); the first color region A of the second group G2 and the second color region B and the third color region C of the third group G3 together form a second 3D display pixel unit P2 (shown in FIG. 4); the first color region A and the second color region B of the fourth group G4 and the third color region C of the fifth group G5 together form a third 3D display pixel unit P3 (shown in FIG. 4); the first color region A of the fifth group G5 and the second color region B and the third color region C of the at least sixth group G6 together form a fourth 3D display pixel unit P4 (shown in FIG. 4). That is to say, in the 3D display mode, each of the 3D display pixel units P1~P4 is one pixel unit containing at least three sub-pixel regions with different colors (i.e., red, green, and blue sub-pixel regions). Specifically, the first 3D display pixel unit P1 and the second 3D display pixel unit P2 arranged on the first sub-row L1-1 of the first row L1 provide image information to the left eye of a viewer, and the third 3D display pixel unit P3 and the fourth 3D display pixel unit P4 arranged on the second sub-row L2-2 of the second row L2 provide image information to the right eye of the viewer. Note that the image information can also be provided to the right eye of the viewer by the pixel unit respectively on the third sub-row L3-1 of the third row L3 and to the left eye of the viewer by the second sub-row L4-2 of the fourth row L4 when the stereoscopic image is displayed. Hence, in order to display the stereoscopic image, the image information provided to the left eye (Le) and the right eye (Re) of the viewer substantially includes Le1-Re1-Re2-Le2 arranged sequentially from top to bottom in the front view of the FIG. 4. Here, the information provided to the left eye is Le1, Le2, and the information provided to the right eye is Re1, Re2. According to another embodiment, a optical shutter may be alternatively disposed between the viewer and the 3D display panel, so as to ensure the transmission of left-eye and right-eye information to the left eye and the right eye of the viewer and prevent the crosstalk of the left-eye and right-eye information.

The first shielding region SH1 and the second shielding region SH2 are adjacent to each other in this embodiment. That is to say, the first shielding region SH1 and the second shielding region SH2 are directly adjoin (or namely directly contacted) to each other, and there is no non-shielding region between the two shielding regions SH1 and SH2.

Similarly, if the image resolution is 3840*2160 in the 2D display mode, the image resolution may still reach 2560*1080 in the 3D display mode, and the resolution (2560*1080) in the 3D display mode is still greater than the resolution of a Full-HD display panel. Besides, the color regions (i.e., the sub-pixel regions) on certain sub-rows are turned off in the 3D display mode according to this embodiment; namely, the main-pixel electrodes and the sub-pixel electrodes in the color regions (i.e., the sub-pixel regions) that are not turned off may still be applied to drive the display medium, so as to reduce color shift. Hence, by applying the driving method described in this embodiment, the color performance in the 3D display mode and in the 2D display mode can be at similar levels.

Third Embodiment

Figure 5:
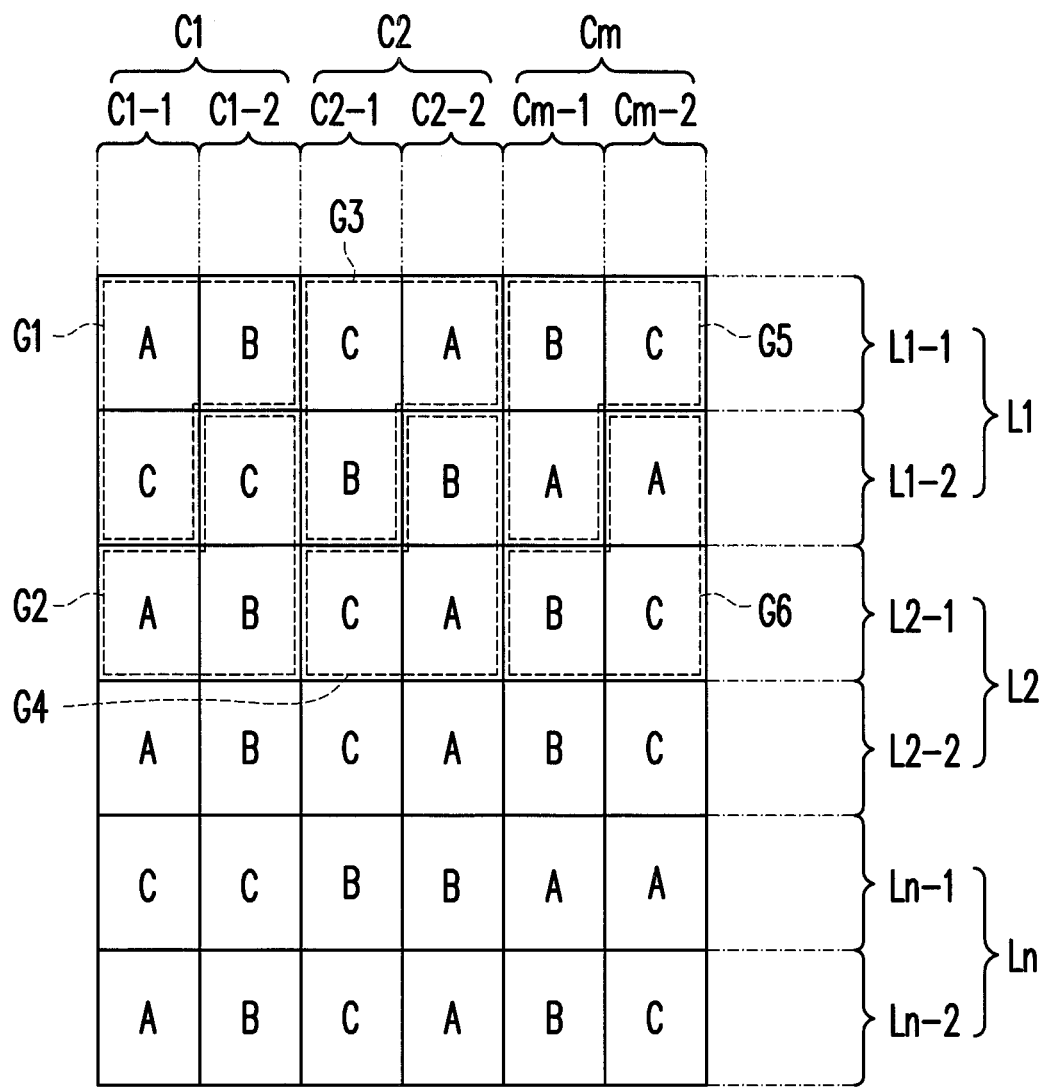
FIG. 5 is a schematic view illustrating a 3D display according to an exemplary embodiment.

FIG. 5 is a schematic view illustrating a 3D display according to an exemplary embodiment. The embodiment shown in FIG. 5 is similar to the embodiment shown in FIG. 1, and thus identical components in FIG. 5 and FIG. 1 will be denoted with the same numerals and will not be repeated herein. According to the embodiment shown in FIG. 5, the first group G1 and the second group G2 respectively have the first color region A, the second color region B, and the third color region C. The first color region A and the second color region B of the first group G1 are arranged on the first sub-row L1-1, the third color region C of the first group G1 and the third color region C of the second group G2 are arranged on the second sub-row L1-2, and the first color region A and the second color region B of the second group G2 are arranged on the first sub-row L2-1 of the second row L2. Hence, the first color region A, the second color region B, and the third color region C of the first group G1 together form a first substantially L-shaped region, and the first color region A, the second color region B, and the third color region C of the second group G2 together form a second substantially L-shaped region. The substantially first L-shaped region and the substantially second L-shaped region together constitute a substantially rectangular region.

In view of the above, the 3D display panel described in the present embodiment further includes at least one third group G3 and at least one fourth group G4 respectively having a first color region A, a second color region B, and a third color region C. The third color region C and the first color region A of the third group G3 are arranged on the first sub-row L1-1; the second color region B of the third group G3 and the second color region B of the fourth group G4 are arranged on the second sub-row L1-2; the third color region C and the first color region A of the fourth group G4 are arranged on the first sub-row L2-1 of the second row L2. Hence, the first color region A, the second color region B, and the third color region C of the third group G3 together form a substantially third L-shaped region, and the first color region A, the second color region B, and the third color region C of the fourth group G4 together form a substantially fourth L-shaped region. The substantially third L-shaped region and the substantially fourth L-shaped region together constitute a substantially rectangular region.

In the present embodiment, the 3D display panel further includes at least one fifth group G5 and at least one sixth group G6 respectively having a first color region A, a second color region B, and a third color region C. The second color region B and the third color region C of the fifth group G5 are arranged on the first sub-row L1-1; the first color region A of the fifth group G5 and the first color region A of the sixth group G6 are arranged on the second sub-row L1-2; the second color region B and the third color region C of the sixth group G6 are arranged on the first sub-row L2-1 of the second row L2. Hence, the first color region A, the second color region B, and the third color region C of the fifth group G5 together form a substantially fifth L-shaped region, and the first color region A, the second color region B, and the third color region C of the sixth group G6 together form a substantially sixth L-shaped region. The substantially fifth L-shaped region and the sixth substantially L-shaped region together constitute a substantially rectangular region.

Namely, in the embodiment shown in FIG. 5, at least one first region (including the color regions A and B) and at least one second region (including the color regions C and A) are arranged on the first sub-row L1-1, and each of the first and second regions respectively has two different colors. For instance, the first region has red and green colors, and the second region has blue and red colors. At least one third region (including the color region C or B) is arranged on the second sub-row L1-2, and the third region has at least one color (e.g., blue or green). For instance, the third region (including the color region C) corresponding to the first region has the blue color, and the third region (including the color region B) corresponding to the second region has the green color. Besides, at least one fourth region (including the color regions B and C) is further arranged on the first sub-row L1-1, and the fourth region has two different colors (e.g., green and blue); at least one fifth region (including the color region A) is arranged on the second sub-row L1-2, and the fifth region has at least one color (e.g., red) and corresponds to the fourth region (including the color regions B and A); at least one sixth region (including the color regions A and B) is arranged on the first sub-row L2-1 of the second row L2, and the sixth region has two different colors (e.g., red and green); at least one seventh region (including the color regions C and A) is arranged on the first sub-row L2-1 of the second row L2, and the seventh region has two different colors (e.g., blue and red); at least one eighth region (including the color region B or C) is arranged on the first sub-row L2-1 of the second row L2, and the eighth region has at least one color (e.g., blue). For instance, the eighth region (including the color region C) corresponding to the sixth region has the blue color, and the eighth region (including the color region B) corresponding to the seventh region has the green color. Besides, at least one ninth region (including the color regions B and C) is further arranged on the first sub-row L2-1, and the ninth region has two different colors (e.g., green and blue); at least one fifth region (including the color region A) is arranged on the second sub-row L1-2, and the fifth region has at least one color (e.g., red) and corresponds to the fourth region (including the color regions B and A).

In the aforesaid display, when images are displayed in a 2D mode, the arrangement of the sub-pixel regions is shown in FIG. 5, and each of the groups (G1~G6) is equal to one pixel unit containing at least three sub-pixel regions with different colors (i.e., red, green, and blue sub-pixel regions).

Figure 6:
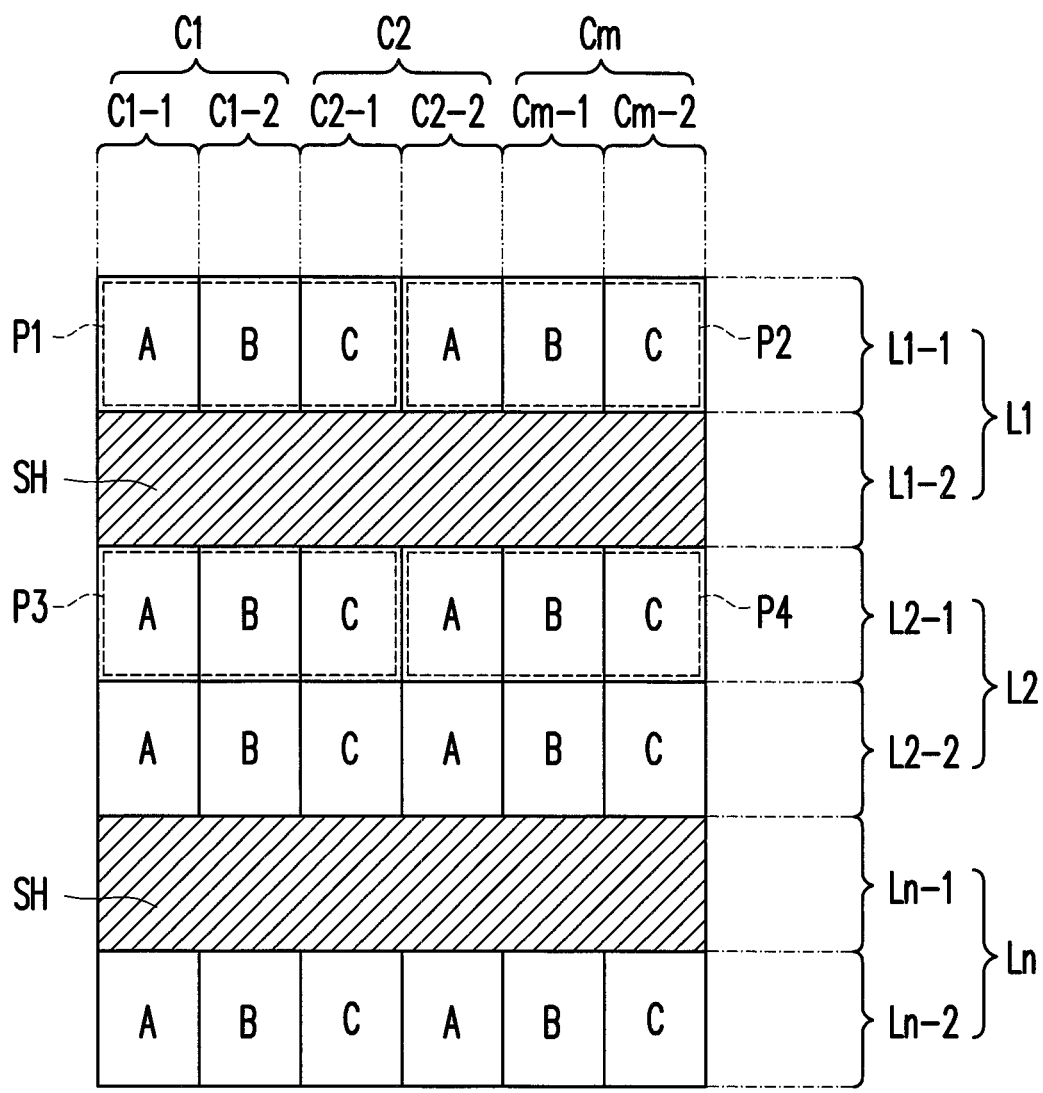
FIG. 6 is a schematic view illustrating the 3D display depicted in FIG. 5 in a 3D display mode.

By contrast, when the images are displayed in a 3D display mode, the driving method of the display is described below. With reference to FIG. 5 and FIG. 6, the driving method includes turning off the third color region C of the first group G1, the third color region C of the second group G2, the second color region B of the third group G3, the second color region B of the fourth group G4, the first color region A of the fifth group G5, and the first color region A of the sixth group G6, so as to form a shielding region SH. The first color region A and the second color region B of the first group G1 and the third color region C of the third group G3 together form a first 3D display pixel unit P1 (shown in FIG. 6); the first color region A of the third group G3 and the second color region B and the third color region C of the fifth group G5 together form a second 3D display pixel unit P2 (shown in FIG. 6); the first color region A and the second color region B of the second group G2 and the third color region C of the fourth group G4 together form a third 3D display pixel unit P3 (shown in FIG. 6); the first color region A of the fourth group G4 and the second color region B and the third color region C of the sixth group G6 together form a fourth 3D display pixel unit P4 (shown in FIG. 6). That is to say, in the 3D display mode, each of the 3D display pixel units P1~P4 is one pixel unit containing at least three sub-pixel regions with different colors (i.e., red, green, and blue sub-pixel regions). Specifically, the first 3D display pixel unit P1 and the second 3D display pixel unit P2 arranged on the first sub-row L1-1 of the first row L1 provide image information to the left eye of a viewer, and the third 3D display pixel unit P3 and the fourth 3D display pixel unit P4 arranged on the first sub-row L2-1 of the second row L2 provide image information to the right eye of the viewer. Note that the image information can also be provided to the right eye of the viewer by the pixel unit respectively on the second sub-row L2-2 of the second row L2 and to the left eye of the viewer by the second sub-row L3-2 of the third row L3 when the stereoscopic image is displayed. Hence, in order to display the stereoscopic image, the image information provided to the left eye (Le) and the right eye (Re) of the viewer substantially includes Le1-Re1-Re2-Le2 arranged sequentially from top to bottom in the front view of the FIG. 6. Here, the information provided to the left eye is Le1, Le2, and the information provided to the right eye is Re1, Re2. According to another embodiment, a barrier may be alternatively disposed between the viewer and the 3D display panel, so as to ensure the transmission of left-eye and right-eye information to the left eye and the right eye of the viewer and prevent the crosstalk of the left-eye and right-eye information.

Similarly, if the image resolution is 3840*2160 in the 2D display mode, the image resolution may still reach 2560*1080 in the 3D display mode, and the resolution (2560*1080) in the 3D display mode is still greater than the resolution of a Full-HD display panel. Besides, the color regions (i.e., the sub-pixel regions) on certain sub-rows are turned off in the 3D display mode according to this embodiment; namely, the main-pixel electrodes and the sub-pixel electrodes in the color regions (i.e., the sub-pixel regions) that are not turned off may still be applied to drive the display medium, so as to reduce color shift. Hence, by applying the driving method described in this embodiment, the color performance in the 3D display mode and in the 2D display mode can be at similar levels.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:
1. A driving method of a three-dimensional display panel, comprising:
providing the three-dimensional display panel having a plurality of columns and a plurality of rows, each of the rows having at least one sub-row, the three-dimensional display panel comprising:
at least one first group and at least one second group arranged on a first row of the rows, the at least one first group and the at least one second group respectively having a first color region, a second color region, and a third color region, wherein the first color region and the second color region of the at least one first group and the third color region and the first color region of the at least one second group are arranged on one of the sub-rows,
while the third color region of the at least one first group and the second color region of the at least one second group are arranged on another one of the sub-rows, wherein the third color region of the at least one first group and the second color region of the at least one second group each respectively corresponds and crosses two neighborly sub-columns such that a long side of the third color region of the at least one first group is substantially equal to a total width of short sides of the first and second color regions in the first group, and a long side of the second color region of the at least one second group is substantially equal to a total width of short sides of the first and second color regions in the second group;
at least one third group arranged on the first row together with the at least one first group and the at least one second group, the at least one third group having a first color region, a second color region, and a third color region, the second color region and the third color region of the at least one third group, the first color region and the second color region of the at least one first group, and the third color region and the first color region of the at least one second group are arranged on the same sub-row,
while the first color region of the at least one third group, the third color region of the at least one first group, and the second color region of the at least one second group are arranged on another sub-row, wherein the first color region of the at least one third group corresponds and crosses two neighborly sub-columns such that a long side of the first color region of the at least one third group is substantially equal to a total width of short sides of the second and third color regions in the third group; and
at least one fourth group, at least one fifth group, and at least one sixth group arranged on a second row of the rows, the at least one fourth group, the at least one fifth group, and the at least one sixth group respectively having a first color region, a second color region, and a third color region, wherein the third color region of the at least one fourth group, the second color region of the at least one fifth group, and the first color region of the at least one sixth group each respectively correspond and crosses two neighborly sub-columns such that a long side of the third color region of the at least one fourth group is substantially equal to a total width of short sides of the first and second color regions in the fourth group, a long side of the second color region of the at least one fifth group is substantially equal to a total width of short sides of the third and first color regions in the fifth group, and a long side of the first color region of the at least one sixth group is substantially equal to a total width of short sides of the second and third color regions in the sixth group, wherein the arrangement of the first color regions, the second color regions, and the third color regions of the different groups on the second row is mirror symmetrical to the arrangement of the first color regions, the second color regions, and the third color regions of the different groups on the first row; and when a stereoscopic image is to be displayed, turning off the third color region of the first group, the second color region of the second group, and the first color region of the third group, so as to form a first shielding region, and turning off the third color region of the fourth group, the second color region of the fifth group, and the first color region of the sixth group, so as to form a second shielding region, wherein the first color region and the second color region of the first group and the third color region of the second group together form a first three-dimensional display pixel unit, the first color region of the second group and the second color region and the third color region of the third group together form a second three-dimensional display pixel unit, the first color region and the second color region of the fourth group and the third color region of the fifth group together form a third three-dimensional display pixel unit, the first color region of the fifth group and the second color region and the third color region of the sixth group together form a fourth three-dimensional display pixel unit, and the first shielding region and the second shielding region are adjacent to each other.

\* \* \* \* \*